(12) United States Patent
Fukui et al.

(10) Patent No.: US 12,240,451 B2
(45) Date of Patent: Mar. 4, 2025

(54) DRIVING ASSIST APPARATUS

(71) Applicant: TOYOTA JIDOSHA KABUSHIKI KAISHA, Toyota (JP)

(72) Inventors: Yusuke Fukui, Toyota (JP); Chen Xi, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 284 days.

(21) Appl. No.: 17/981,972

(22) Filed: Nov. 7, 2022

(65) Prior Publication Data
US 2023/0303069 A1    Sep. 28, 2023

(30) Foreign Application Priority Data

Mar. 23, 2022   (JP) .................. 2022-046215

(51) Int. Cl.
*B60W 30/095* (2012.01)
(52) U.S. Cl.
CPC ... *B60W 30/0956* (2013.01); *B60W 2554/804* (2020.02)
(58) Field of Classification Search
CPC ....... B60W 30/0956; B60W 2554/804; B60W 2554/80; B60W 2554/806; B60W 30/09
See application file for complete search history.

(56) References Cited

U.S. PATENT DOCUMENTS

| | | | |
|---|---|---|---|
| 9,105,190 B2 | 8/2015 | Akiyama | |
| 9,393,960 B2 | 7/2016 | Kodaira | |
| 9,483,945 B2 | 11/2016 | Okita et al. | |
| 9,873,412 B2 | 1/2018 | Moriizumi | |
| 10,793,147 B2 | 10/2020 | Kaminade et al. | |
| 2007/0046449 A1 | 3/2007 | Koike et al. | |
| 2015/0291159 A1* | 10/2015 | Sasabuchi | G01S 13/867 701/1 |
| 2016/0167580 A1 | 6/2016 | Hanita et al. | |
| 2019/0005821 A1* | 1/2019 | Matsunaga | G01S 13/931 |
| 2020/0118435 A1* | 4/2020 | Goto | G08G 1/096716 |
| 2021/0009120 A1* | 1/2021 | Hamada | B60W 30/0956 |
| 2021/0061309 A1 | 3/2021 | Kawanai | |
| 2021/0107521 A1 | 4/2021 | Fujita et al. | |
| 2021/0107528 A1 | 4/2021 | Fujita et al. | |
| 2021/0146956 A1 | 5/2021 | Fujita et al. | |
| 2021/0146958 A1 | 5/2021 | Tanaka et al. | |

FOREIGN PATENT DOCUMENTS

| | | |
|---|---|---|
| JP | 2007-91208 A | 4/2007 |
| JP | 2015-210588 A | 11/2015 |
| JP | 2016-115129 A | 6/2016 |
| JP | 2020-119183 A | 8/2020 |

\* cited by examiner

*Primary Examiner* — Justin Holmes
(74) *Attorney, Agent, or Firm* — Sughrue Mion, PLLC

(57) ABSTRACT

In a driving assist apparatus which carries out a collision avoidance assist that is an assist for avoiding a collision of a self-vehicle and a collision risk object that is an object judged to have a high possibility to collide with the self-vehicle when the collision risk object is judged to exist, an object which does not exist in an object detection range of a front side radar and whose predicted running locus and a predicted running locus of a self-vehicle intersect at a position within a predetermined distance from the self-vehicle on the front side of the self-vehicle is selected as a target of judgment of a possibility to collide with the self-vehicle based on information acquired by the front lateral side radar, among the objects detected by the front lateral side radar.

6 Claims, 9 Drawing Sheets

DRIVING ASSIST APPARATUS

TECHNICAL FIELD

The present invention relates to a driving assist apparatus. More specifically, the present invention relates to a driving assist apparatus which can effectively reduce operation processing load in a control unit for executing a collision avoidance assist while executing the collision avoidance assist effectively.

BACKGROUND ART

In the art, a driving assist apparatus which detects an object existing around a self-vehicle and performs assist for avoiding a collision between the object and the self-vehicle (which may be referred to as "collision avoidance assist" hereafter) when a possibility that the object and the self-vehicle may collide with each other is judged to be high has been known.

However, since a field angle of a front side radar conventionally used as a means for detecting an object existing around a self-vehicle is narrow, it is difficult to detect an object approaching a self-vehicle from a lateral side, for example at a crossing, etc. at an early stage. Therefore, in these days, a radar which detects an object existing in front lateral sides (right front and left front) of a self-vehicle (which may be referred to as a "front lateral side radar" hereafter) has been introduced widely, for the purpose of detecting an object approaching a self-vehicle from a lateral side at an early stage, etc.

FIG. 1 is a schematic view for showing a situation where another vehicle is approaching a self-vehicle comprising a front side radar and a front lateral side radar from a lateral side. In FIG. 1, hatching with vertical stripes is given to a region F where an object can be detected by a front side radar (not shown) which a self-vehicle 10 comprises, and hatching with horizontal stripes is given to a region S where an object can be detected by a front lateral side radar (not shown) which the self-vehicle 10 comprises. As a result, hatching with a lattice is given to a range in which the region F and the region S overlap with each other.

Since a field angle of a front side radar is narrow as shown by the region F, it is difficult for the front side radar to detect another vehicle 20 approaching the self-vehicle 10 from a lateral side at an early stage. However, the another vehicle 20 can be detected at an early stage by introducing the front lateral side radar which has a large field angle toward a front lateral side of the self-vehicle 10 as shown by the region S. In addition, as shown in FIG. 1, in the present specification, a running direction of a self-vehicle is a positive direction of an X-axis, and a direction to a left side from a right side of the self-vehicle is a positive direction of a Y-axis. Moreover, although not shown, a position of the self-vehicle is an origin.

It becomes possible to perform a collision avoidance assist more certainly by introducing a front lateral side radar as mentioned above. On the other hand, since the number of objects detected as the objects existing around the self-vehicle increases, operation processing load in a control unit for executing a collision avoidance assist also increases. When operation processing capability of a control unit is enhanced in order to cope with such increase of operation processing load, there is a possibility that it may lead to cost increase of a driving assist apparatus which carries out a collision avoidance assist. Therefore, it is becoming increasingly necessary to reduce the operation processing load by excluding an object which is judged to be unlikely to collide with a self-vehicle from being a target of a collision avoidance assist.

For example, in the Patent Document 1 (PTL1), a control unit for a vehicle comprising a circumstance information receiving part to receive circumstance information of a self-vehicle, a vehicle information receiving part to receive vehicle information of the self-vehicle, a circumstance situation judgment part to judge a circumstance situation of the self-vehicle based on the circumstance information and vehicle information, and a vehicle control part to control an actuator of the self-vehicle based on the circumstance situation is disclosed. In the control unit for a vehicle, the circumstance information receiving part comprises a data receiving part to perform data reception processing of data transmitted from a circumstance information sensor, a data conversion part to perform conversion processing for converting the data after the reception processing into a form which can be used by the circumstance circumstantial judgment part, and an excluded data determination part to determine the data to be excluded from being a target of the reception processing or conversion processing based on the data after the reception processing. Thereby, it is said that load for processing of data transmitted from a sensor can be reduced.

In the above-mentioned conventional technology, as a specific technique for determining the data to be excluded from being a target of the reception processing or conversion processing, for example, excluding data output from a sensor which has predetermined reliability lower than a predetermined threshold value or a sensor which detects an object having predetermined reliability lower than a predetermined threshold value or an object existing on a side opposite to a running direction of a self-vehicle is mentioned. However, an object detected by a sensor having reliability lower than a threshold value, an object having reliability lower than a predetermined threshold value and/or an object existing on a side opposite to a running direction of a self-vehicle is not always unlikely to collide with the self-vehicle.

On the other hand, in accordance with the above-mentioned technique, for example, data output from a sensor which has predetermined reliability higher than a predetermined threshold value and a sensor which detects an object having predetermined reliability higher than a predetermined threshold value or an object existing on the same side as the running direction of a self-vehicle is not excluded from being a target of the reception processing or conversion processing. Therefore, since an object detected by a sensor having reliability higher than a threshold value, an object having reliability higher than a threshold value and/or an object existing on the same side as the running direction of a self-vehicle are not excluded from being a target of the reception processing or conversion processing even when a possibility that the object may collide with the self-vehicle is low, load for processing of data transmitted from a sensor cannot be necessarily reduced.

Namely, in the art, a technology which can effectively reduce operation processing load in a control unit for executing a collision avoidance assist while executing the collision avoidance assist effectively is demanded.

CITATION LIST

Patent Literature

[PTL1] Japanese Patent Application Laid-Open (kokai) No. 2020-119183

SUMMARY OF INVENTION

Technical Problem

As mentioned above, in the art, a technology which can effectively reduce operation processing load in a control unit for executing a collision avoidance assist while executing the collision avoidance assist effectively is demanded.

Solution to Problem

Therefore, as a result of diligent research, the present inventor has found out that the above-mentioned problem can be solved by selecting an object which does not exist in an object detection range of a front side radar and whose predicted running locus and a predicted running locus of a self-vehicle intersect with each other at a position within a predetermined distance from the self-vehicle on the front side of the self-vehicle, as a target of judgment of a possibility to collide with the self-vehicle based on information acquired by a front lateral side radar, among the objects detected by the front lateral side radar.

Specifically, a driving assist apparatus according to the present invention (which may be referred to as a "present invention apparatus" hereafter) is a driving assist apparatus comprising a first object information acquisition means, a second object information acquisition means and a collision avoidance assist control means. The first object information acquisition means acquires first information that is information about a first object which exists in a front side region of a self-vehicle. The second object information acquisition means acquires second information that is information second objects which exist in a front lateral side region of the self-vehicle. The collision avoidance assist control means carries out a collision avoidance assist that is assist for avoiding a collision of the self-vehicle and a collision risk object that is one of said first object or second objects judged to collide with the self-vehicle when the collision risk object is judged to exist based on at least ether one of the first information and the second information.

Furthermore, in the present invention apparatus, the collision avoidance assist control means comprises a collision judgment object selecting part to select, among the second objects, a collision judgment target object that is the second object whose possibility to collide with the self-vehicle is to be judged based on the second information. The collision judgment object selecting part selects, as the collision judgment target object, the second object for which all conditions included in a first collision judging condition group that is a condition group consisting of a first condition to a third condition as listed below are simultaneously satisfied.

The first condition is a condition that the second object exists in a specific range that is a range excluding a third range that is a range where a first range that is an object detection range of the first object information acquisition means and a second range that is an object detection range of the second object information acquisition means overlap with each other from the second range.

The second condition is a condition that a first locus that is a predicted running locus of the self-vehicle and a second locus that is a predicted running locus of the second object intersect with each other.

The third condition is a condition that the first locus and the second locus intersect with each other at a position within a predetermined distance from the self-vehicle on a front side of the self-vehicle in the first locus.

Advantageous Effects of Invention

As mentioned above, in the present invention apparatus, the second object for which all the first to third conditions are simultaneously satisfied is selected as the collision judgment target object. In other words, in the present invention apparatus, the second object for which at least one of the first condition to the third condition is not satisfied will not be selected as the collision judgment target object. Thereby, in the present invention apparatus, the second object with a low possibility to collide with the self-vehicle can be excluded from being a target of a collision avoidance assist. Therefore, in accordance with the present invention apparatus, operation processing load in a control unit for executing a collision avoidance assist can be effectively reduced while executing the collision avoidance assist effectively.

Other objectives, other features and accompanying advantages of the present invention will be easily understood from the following explanation about respective embodiments of the present invention, which will be described referring to drawings.

DESCRIPTION OF EMBODIMENTS

First Embodiment

Hereafter, a driving assist apparatus according to a first embodiment of the present invention (which may be referred to as a "first apparatus" hereafter.) will be explained, referring to drawings.

Figure 2:
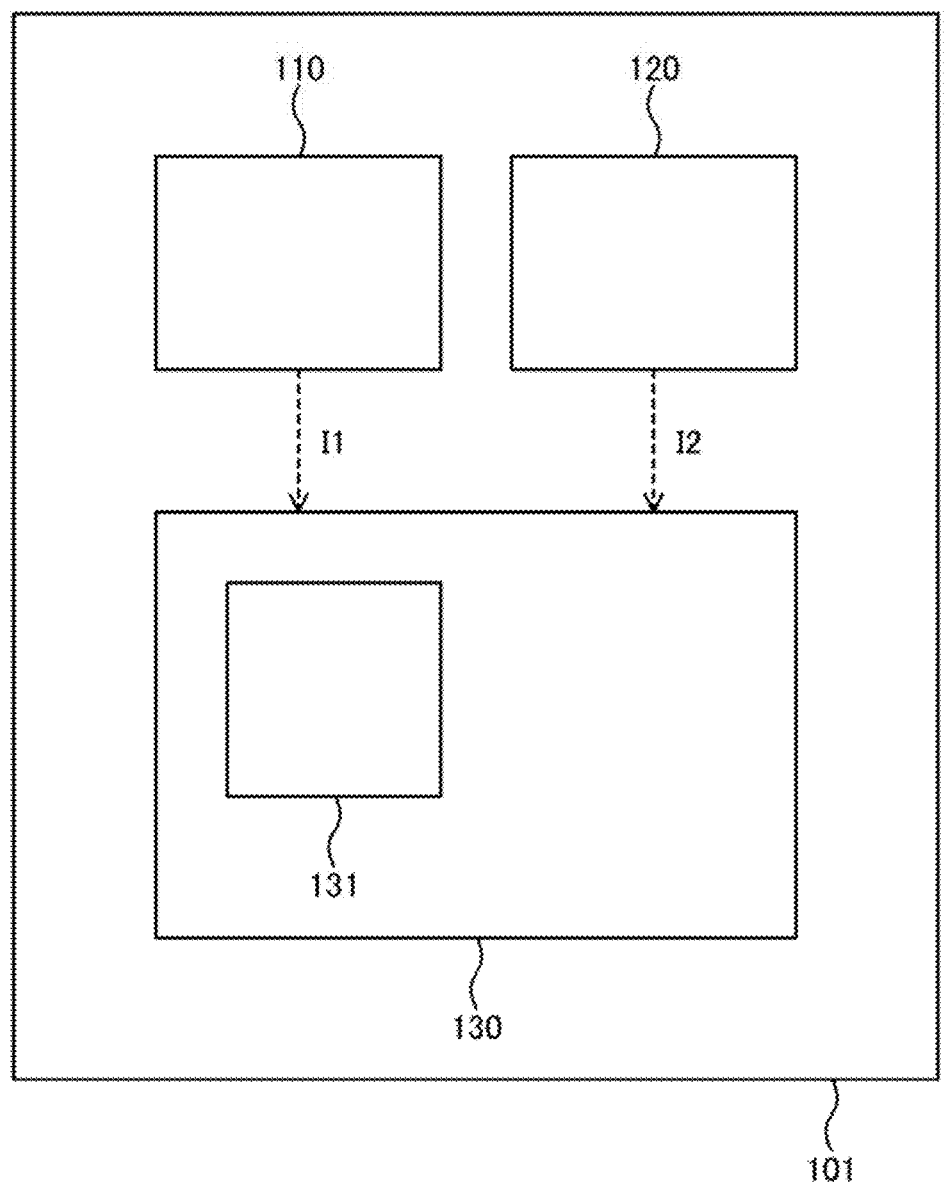
FIG. 2 is a schematic block diagram for showing an example of a configuration of a driving assist apparatus according to a first embodiment of the present invention (first apparatus).

FIG. 2 is a schematic block diagram for showing an example of a configuration of the first apparatus. Arrows in a dashed line illustrated in FIG. 2 expresses flows of (data signals including) information in the first apparatus exemplified in FIG. 2.

The first apparatus 101 is a driving assist apparatus is a driving assist apparatus comprising a first object information acquisition means 110, a second object information acquisition means 120 and a collision avoidance assist control means 130. The first object information acquisition means 110 acquires first information I1 that is information about a first object which exists in a front side region of a self-vehicle. The first object information acquisition means 110 is a radar system, such as a milliwave radar configured so as to detect an object which exists in a front side region of a self-vehicle, for example (which may be referred to as a "front side radar" hereafter.). The first information I1 includes information about a position, a speed and a running direction of an object detected by the first object information acquisition means 110, for example.

The second object information acquisition means 120 acquires second information I2 that is information second objects which exist in a front lateral side region of the self-vehicle. The second object information acquisition means 120 is a radar system, such as a milliwave radar configured so as to detect an object which exists in a front lateral side region of a self-vehicle, for example (which may be referred to as a "front lateral side radar" hereafter.). The second information I2 includes information about a position, a speed and a running direction of an object detected by the second object information acquisition means 120, for example.

The collision avoidance assist control means 130 performs a collision avoidance assist that is an assist for avoiding a collision of the self-vehicle and a collision risk object that is an one of said first object or second objects judged to collide with the self-vehicle based on the first information I1 and the second information I2 when the collision risk object is judged to exist. The collision avoidance assist includes an alarm to a driver and vehicle control for avoiding a collision, etc., for example. As specific examples of the alarm, generation of sound, light and vibration, and display of an image and/or a character, etc. can be exemplified, for example.

Sound as an alarm can be generated from a sound generator that is a device which generates sound, such as an audio instrument and/or a buzzer which the self-vehicle comprises, for example. As specific example of such sound, sound (for example, alarm sound, etc.), voice (including synthetic voice) and music, etc. can be exemplified, for example. Light as an alarm can be generated from an electric bulb and/or a light emitting element (for example, a light emitting diode (LED), etc.) which a light generator that is a device which generates light comprises, such as a warning light which the self-vehicle comprises, for example.

Vibration as an alarm can be generated from a vibration generator that is a device which generates vibration, such as a motor and/or vibrator incorporated so as to vibrate a handle and/or seat, etc. which the self-vehicle comprises, for example. An image and/or a character as an alarm can be displayed by an image display device which displays an image and/or a character, such as a multi-information display (MID) and a display of multimedia (MM) apparatus which the self-vehicle comprises, for example. As a specific example of such an image, a still picture (for example, a figure, a pattern and a mark, etc.) and a video (for example, an animation, etc.), etc. can be exemplified, for example.

As a specific example of vehicle control, autonomous braking, autonomous steering, etc. can be mentioned, for example. Such vehicle control can be carried out by operating a brake mechanism and a steering mechanism which the self-vehicle comprises by an actuator, etc. which are controlled by the collision avoidance assist control means, for example.

Furthermore, in the first apparatus 101, an object having a low possibility to collide with the self-vehicle is previously excluded from being a target of the collision avoidance assist, even when the object is an object detected by the second object information acquisition means 120. In other words, in the first apparatus 101, among objects detected by the second object information acquisition means 120, an object having a high possibility to collide with the self-vehicle is selected as a target for which a possibility to collide with the self-vehicle is judged based on the second information I2.

Specifically, the collision avoidance assist control means 130 comprises a collision judgment object selecting part 131 to select, among the second objects that are the objects for which the second information I2 has been acquired, a collision judgment target object that is the second object whose possibility to collide with the self-vehicle is to be judged based on the second information I2. The collision judgment object selecting part 131 selects, as the collision judgment target object, the second object for which all conditions included in a first collision judging condition group that is a condition group consisting of a first condition to a third condition as listed below are simultaneously satisfied.

Figure 1:
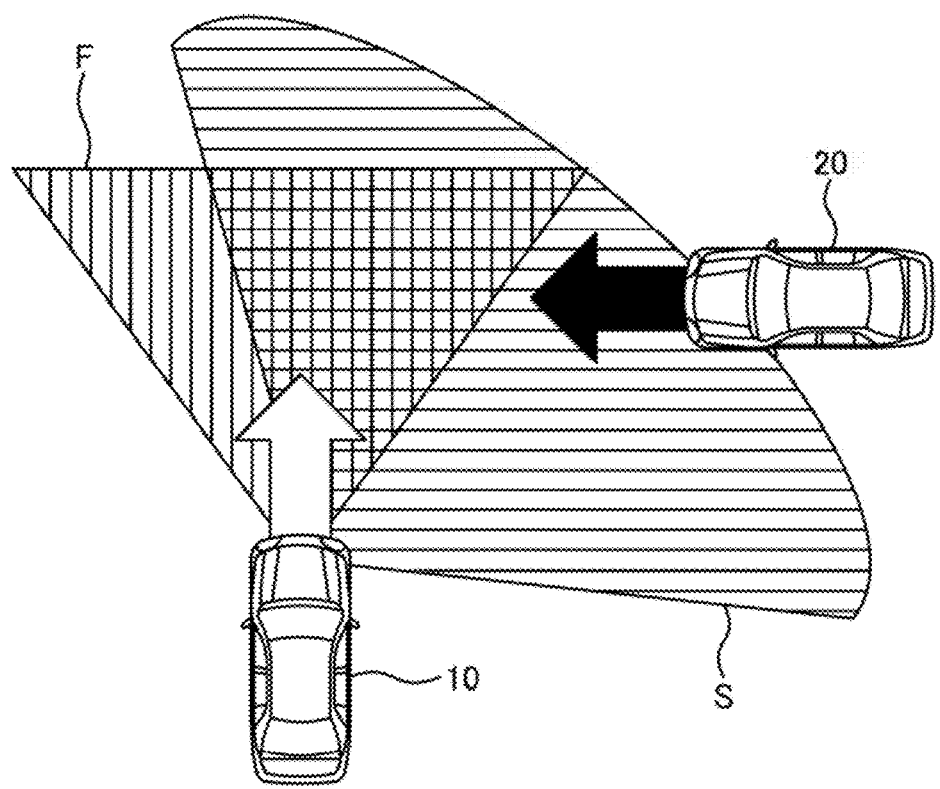
FIG. 1 is a schematic view for showing a situation where another vehicle is approaching a self-vehicle comprising a front side radar and a front lateral side radar front radar from a lateral side.

The first condition is a condition that the second object exists in a specific range that is a range excluding a third range that is a range where a first range that is an object detection range of the first object information acquisition means 110 and a second range that is an object detection range of the second object information acquisition means 120 overlap with each other from the second range. The first range is a region where an object which exists in the front side region of the self-vehicle can be detect by the first object information acquisition means 110, and is the region F exemplified in FIG. 1, for example. The second range is a region where an object which exists in the front lateral side region of the self-vehicle can be detected by the second object information acquisition means 120, and is the region S exemplified in FIG. 1, for example. The third range is a range where these first range and second range overlap with each other, and is a range where the region F and region S exemplified in FIG. 1 overlap with each other (range to which hatching with a vertical-horizontal lattice is given). The specific range is a range excluding the third range from the second range, and is a range excluding the range to which hatching with a vertical-horizontal lattice is given (range where the region F and the region S overlap with each other) from the whole region to which hatching with a vertical stripe is given (region F) in FIG. 1, for example.

As mentioned above, the third range is a range where these first range and second range overlap with each other. Namely, the second object which exists in the third range is an object detected not only by the second object information acquisition means 120, but also by the first object information acquisition means 110. Therefore, from a viewpoint of reducing the operation processing load associated with execution of the collision avoidance assist, it is desirable to exclude an object which exists in the third range among the second objects detected by the second object information acquisition means 120 from being a target whose possibility to collide with the self-vehicle is to be judged based on the second information I2. In other words, from a viewpoint of reducing the operation processing load associated with execution of the collision avoidance assist, it is desirable to select only the second object which does not exist in the third range detected by the second object information acquisition means 120 as a target whose possibility to collide with the self-vehicle is to be judged based on the second information I2. Therefore, in the first apparatus, as one of conditions for selecting a target whose possibility to collide with the self-vehicle is to be judged based on the second information I2, a condition that the second object exists in the specific range that is a range excluding the third range from the second range (first condition) is imposed.

However, a possibility to collide with the self-vehicle is not necessarily high in all the second objects which exist in the specific range. For example, when a predicted running locus of the second object and a predicted running locus of the self-vehicle do not intersect with each other, it can be judged that a possibility that the second object and the self-vehicle may collide with each other is low. Therefore, in the first apparatus, the first collision judging condition group that is a condition group for selecting the second object which should be selected as the collision judgment target object also includes the following second condition, in addition to the above-mentioned first condition.

The second condition is a condition that a first locus that is a predicted running locus of the self-vehicle and a second locus that is a predicted running locus of the second object intersect with each other. The first locus can be calculated based on the vehicle information (for example, a position, a speed, a running direction and/or a steering angle, etc.) of the self-vehicle, for example. The second locus can be calculated based on the second information I2 of the second object, for example. As will be mentioned later, a routine for selecting the second object which should be selected as the collision judgment target object is repeatedly carried out with a predetermined short time interval (for example, 0.05 second). From a viewpoint of judging correctly whether the second condition is satisfied or not, it is desirable to calculate the first and second loci which accurately coincide with actual moving courses of the self-vehicle and the second object respectively whenever the above-mentioned routine is carried out. However, in this case, there is a possibility that the operation processing load for judging whether the second condition is satisfied or not may become excessive. On the other hand, since a time period required for the first object and the second object to pass each other is very short, even when the first and second loci are regarded and calculated as straight lines, gaps between the actual first and second loci and the first and second loci regarded as straight lines are small.

Figure 3:
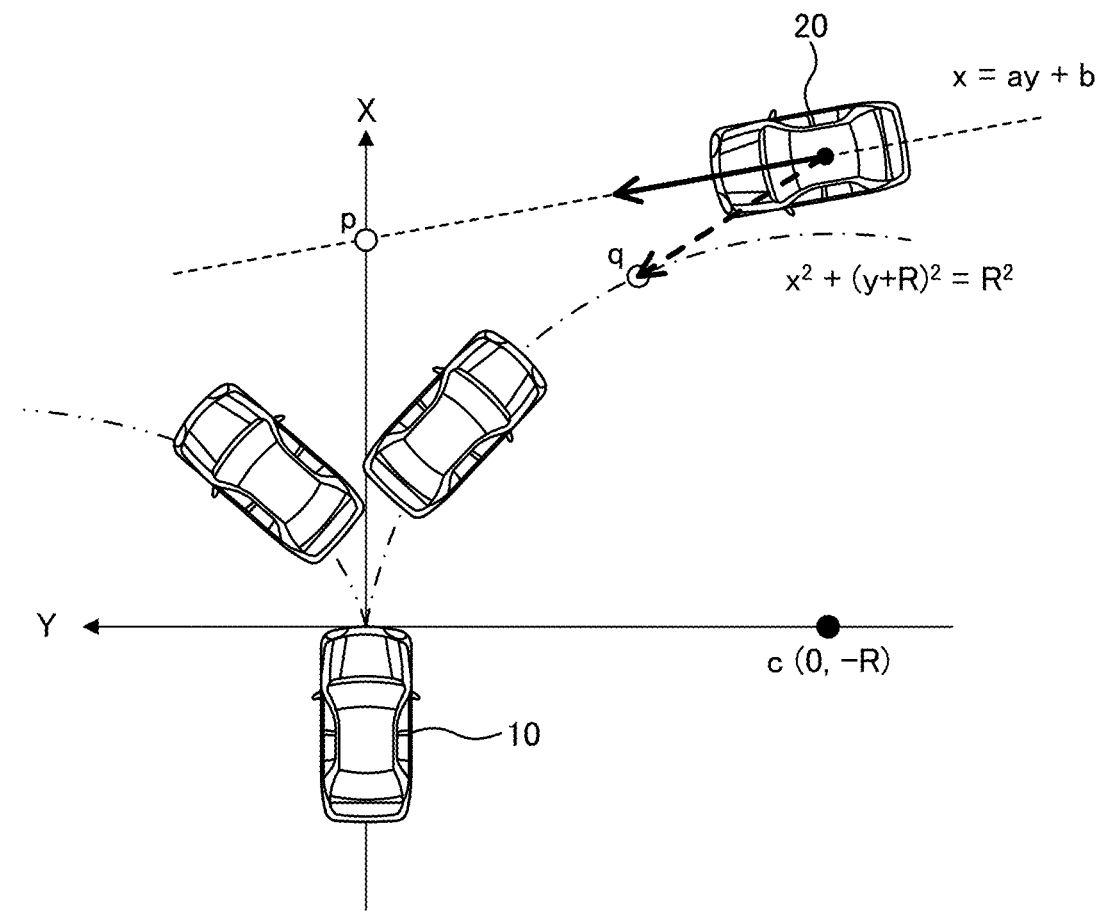
FIG. 3 is a schematic view for explaining how to judge whether a first locus that is a predicted running locus of a self-vehicle and a second locus that is a predicted running locus of a second object intersect with each other or not (simple intersection judgment).

FIG. 3 is a schematic view for explaining how to judge whether the above-mentioned second condition is satisfied or not, namely whether a first locus that is a predicted running locus of a self-vehicle and a second locus that is a predicted running locus of a second object intersect with each other or not (which may be referred to as a "simple intersection judgment" hereafter.). In an example shown in FIG. 3, when a self-vehicle 10 continues to run straightly toward a positive direction of an X-axis and another vehicle 20 that is the second object runs along a straight line (dashed line) represented by an equation "x=ay+b" as indicated by an arrow in a thick solid line, the first locus (X-axis) that is a predicted running locus of the self-vehicle 10 and the second locus (dashed line) that is a predicted running locus of the second object (another vehicle 20) intersect with each other at a point p on the X-axis. Namely, the second condition is satisfied in this case.

On the other hand, when the self-vehicle 10 runs along a first locus in a circular-arc shape with a radius R and a point c on the Y-axis as a center as indicted by a curve illustrated by a one dot chain line, the first locus (one dot chain line) represented by an equation "$x^2+(y+R)^2=R^2$" and the second locus (dashed line) that is a predicted running locus of the second object (another vehicle 20) do not intersect with each other. Namely, the second condition is not satisfied in this case. However, even in a case where the self-vehicle 10 runs along the first locus (one dot chain line) in a circular-arc shape like this, the first locus and the second locus may intersect with each other as exemplified by a point q when the vehicle 20 runs along a second locus different from the above as indicated by an arrow in a thick dashed line. In this case, the second condition is satisfied.

As apparent from the above, it can be said that the judgment (simple intersection judgment) of whether the first locus that is a predicted running locus of a self-vehicle and the second locus that is a predicted running locus of the second object intersect with each other is settled by whether simultaneous equations of an equation representing the first locus and an equation representing the second locus have a real solution or not. When the self-vehicle 10 runs along the circular-arc-like first locus (one dot chain line) represented by the equation "$x^2+(y+R)^2=R^2$" and the another vehicle 20 that is the second object runs along the linear second locus represented by the equation "x=ay+b", it can be judged whether the first locus and the second locus intersect with each other based on whether the simultaneous equations of the equation "$x^2+(y+R)^2=R^2$" and the equation "x=ay+b" have a real solution.

In addition, when the first locus and the second locus are regarded as straight lines to perform the simple intersection judgment in light of that the time period required for the first object and the second object to pass each other is very short as mentioned above, both the first locus and the second locus may be represented by linear equations. In this case, since the simple intersection judgment can be performed by solving simultaneous equations consisting of two linear equations (simultaneous linear equations), the operation processing load associated with execution of the collision avoidance assist can be reduced.

By the way, a possibility to collide with self-vehicle is not necessarily high in all the second object for which it is judged that the second object exists in the specific range and the first locus and the second locus intersect with each other as a result of the simple intersection judgment. For example, in a case where the first locus and the second locus intersect with each other far ahead of the self-vehicle and in a case where the first locus and the second locus intersect with each other behind the self-vehicle, etc., a possibility that the second object which runs along the second locus and the self-vehicle may collide with each other can be judged to be low. Therefore, in the first apparatus, the first collision judging condition group that is a condition group for selecting the second object which should be selected as the collision judgment target object also includes the following third condition, in addition to the above-mentioned first and second conditions.

The third condition is a condition that the first locus and the second locus intersect with each other at a position within a predetermined distance from the self-vehicle on a front side of the self-vehicle in the first locus. It can be judged whether the third condition is satisfied or not, namely whether the first locus and the second locus intersect with each other at a position within a predetermined distance from the self-vehicle on a front side of the self-vehicle in the first locus or not, based on positions, speeds and running directions of the self-vehicle and the second object, etc., for example. A specific method of this judgment will be explained later in detail in an explanation about another embodiment of the present invention.

Figure 4:
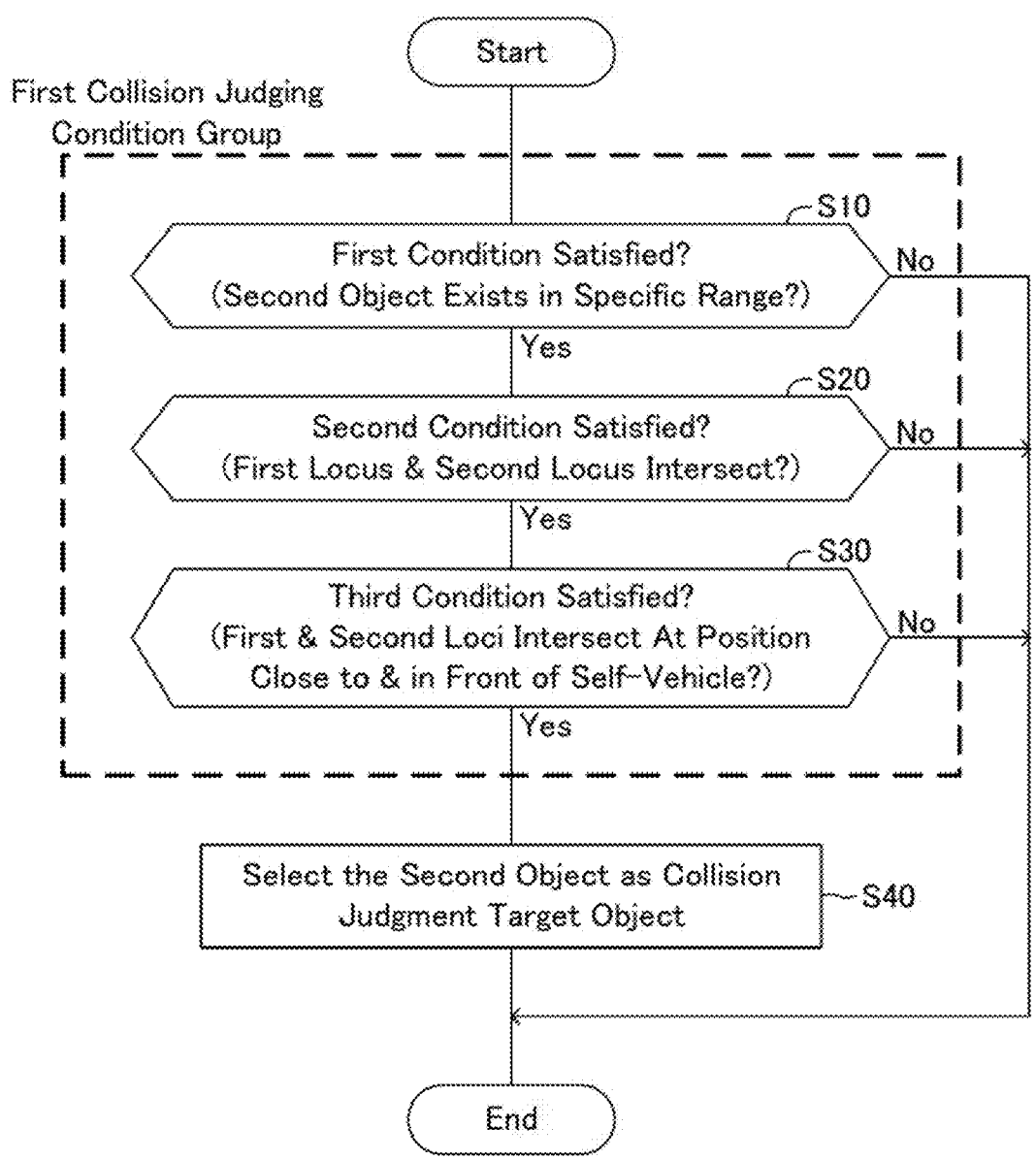
FIG. 4 is a flow chart for showing an example of a flow of various processing in a collision judgment target object selecting routine carried out in the first apparatus.

Hereafter, a routine in which the second object for which all the first to third conditions included in the first collision judging condition group are satisfied simultaneously is selected as a collision judgment target object by the collision judgment object selecting part 131 will be referred to as a "collision judgment target object selecting routine." FIG. 4 is a flow chart for showing an example of a flow of various processing in the collision judgment target object selecting routine carried out in the first apparatus. In the first apparatus 101, the collision judgment target object selecting routine which will be explained in detail below is repeatedly carried out with a predetermined short time interval (for example, 0.05 second).

When the collision judgment target object selecting routine is started, in Step S10, it is judge whether the above-mentioned first condition is satisfied or not (namely, whether the second object exists in the specific range or not). The position of the second object can be determined based on the second information I2 acquired by the second object information acquisition means 120. When the first condition is satisfied (Step S10: Yes), in the next Step S20, it is judged whether the above-mentioned second condition is satisfied or not (namely, whether the first locus that is a predicted running locus of the self-vehicle and the second locus that is a predicted running locus of the second object intersect with each other or not). As mentioned above, the first locus can be calculated based on the vehicle information (for example, a position, a speed, a running direction and/or a steering angle, etc.) of the self-vehicle, for example, and the second locus can be calculated based on the second information I2 of the second object, for example.

When the second condition is satisfied (Step S20: Yes), in the next Step S30, it is judged whether the above-mentioned third condition is satisfied or not (namely, whether the first locus and the second locus intersect with each other at a position within a predetermined distance from the self-vehicle on a front side of the self-vehicle in the first locus or not). As mentioned above, it can be judged whether the third condition is satisfied or not, namely whether the first locus and the second locus intersect with each other at a position within a predetermined distance from the self-vehicle on a front side of the self-vehicle in the first locus or not, based on positions, speeds and running directions of the self-vehicle and the second object, etc., for example.

When the third condition is satisfied (Step S30: Yes), since all the conditions included in the first collision judging condition group that is a condition group consisting of the above-mentioned first to third conditions are simultaneously satisfied, the second object is selected as the collision judgment target object in the next step S40. On the other hand, when a judgment result is "No" in any of Step S10 in which it is judged whether the first condition is satisfied or not, Step S20 in which it is judged whether the second condition is satisfied or not, and Step S30 in which it is judged whether the third condition is satisfied or not, the collision judgment target object selecting routine is once ended at that time point. Therefore, the second object for which any one or more of the first to third conditions is not satisfied is not selected as the collision judgment target object.

Namely, in the first apparatus, the second object with a low possibility to collide with the self-vehicle among the second objects detected by the second object information acquisition means is previously excluded from being a target of the collision avoidance assist. As a result, in accordance with the first apparatus, the operation processing load in a control unit for carrying out the collision avoidance assist can be reduced effectively, while carrying out the collision avoidance assist effectively.

Functions of the first apparatus as mentioned above can be realized by an ECU mounted on the self-vehicle, for example. In the present specification, the "ECU" is an electronic control unit which comprises a microcomputer as its principal part, and may be referred to as a "controller." The microcomputer includes a CPU (processor), ROM, RAM, nonvolatile memory and an interface, etc. The CPU is configured so as to realize various functions by carrying out instructions (programs, routines) stored in the ROM. These various functions may be carried out by one specific ECU which constitutes the first apparatus, or may be carried out dispersively by a plurality of ECUs. In the latter case, the plurality of the ECUs can be configured so as to be connected through a CAN (Controller Area Network) and to be able to communicate with each other, for example.

Second Embodiment

Hereafter, a driving assist apparatus according to a second embodiment of the present invention (which may be referred to as a "second apparatus" hereafter.) will be explained, referring to drawings.

As mentioned above, in the first apparatus, the second object for which all the conditions included in the first collision judging condition group that is a condition group consisting of the above-mentioned first to third conditions are satisfied simultaneously is selected as the collision judgment target object (the second object whose possibility to collide with the self-vehicle is to be judged based on the second information). In other words, in the first apparatus, the second object for which any one or more of the above-mentioned first to third conditions is not satisfied is not selected as the collision judgment target object. Therefore, in accordance with the first apparatus, the operation processing load in a control unit for carrying out the collision avoidance assist can be reduced effectively, while carrying out the collision avoidance assist effectively.

By the way, object detection accuracy of the first object information acquisition means which acquires the first information that is information about a first object existing in a front side region of the self-vehicle is not necessarily uniform over the entire object detection range. For example, object detection accuracy in a range in the vicinity of both ends of a field angle corresponding to the object detection range, etc. may be lower than object detection accuracy in other ranges included in the object detection range.

When the range in which object detection accuracy of the first object information acquisition means is low as mentioned above is removed as a part of the third range (that is a range where the first range that is an object detection range of the first object information acquisition means and the second range that is an object detection range of the second object information acquisition means overlap with each other) from the second range, as a result, an object existing in this range can be detected only by the first object information acquisition means (whose object detection accuracy in this range is low). Therefore, from a viewpoint of carrying out the collision avoidance assist more certainly and effectively, it is desirable to prevent the range in which object detection accuracy of the first object information acquisition means is low as mentioned above from being included in the third range (which is removed from the second range that is an object detection range of the second object information acquisition means).

Therefore, the second apparatus is a driving assist apparatus, characterized in that a range in which object detection accuracy of the first object information acquisition means is less than a predetermined threshold value is excluded from the third range.

Figure 5:
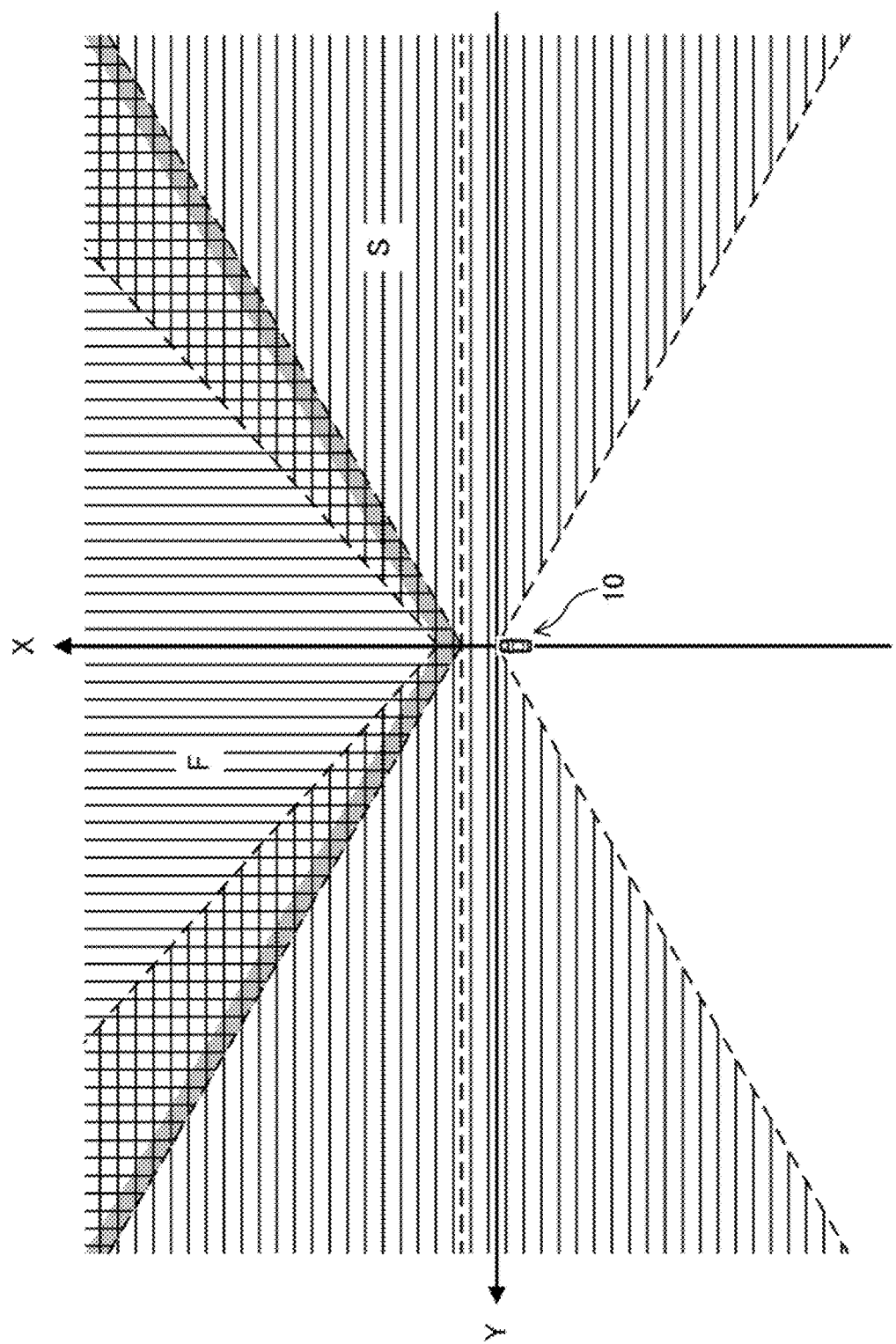
FIG. 5 is a schematic view for showing an example of a first range, a second range, a third range and a specific range in a driving assist apparatus according to a second embodiment of the present invention (second apparatus).

FIG. 5 is a schematic view for showing an example of a first range, a second range, a third range and a specific range in the second apparatus. In FIG. 5, hatching with vertical stripes is given to a region F (first range) where an object can be detected by the first object information acquisition means (for example, a front side radar) which the self-vehicle 10 comprises. On the other hand, hatching with horizontal stripes is given to a region S (second range) where an object can be detected by the second object information acquisition means (for example, a front lateral side radar) which the self-vehicle 10 comprises. As a result, hatching with a lattice is given to a range (third range) in which the region F and the region S overlap with each other.

In the above-mentioned first apparatus, the range (range to which only hatching with horizontal stripes is given in the regions S) excluding the third range (range to which hatching with a lattice is given) from the second range (range to which hatching with horizontal stripe is given) becomes the specific range. Therefore, the second object which exists in the third range is excluded from being a target whose possibility to collide with the self-vehicle is judged based on the second information I2. As a result, in accordance with the first apparatus, the operation processing load in the control unit for carrying out the collision avoidance assist can be reduced effectively, while carrying out the collision avoidance assist effectively.

However, as mentioned above, object detection accuracy of the first object information acquisition means which acquires the first information that is information about a first object existing in a front side region of the self-vehicle is not necessarily uniform over the entire object detection range. For example, object detection accuracy in a range in the vicinity of both ends of a field angle corresponding to the object detection range, etc. may be lower than object detection accuracy in other ranges included in the object detection range.

In the example shown in FIG. 5, object detection accuracy in a range in the vicinity of both ends of a field angle corresponding to the object detection range, etc. may be lower than object detection accuracy in other ranges included in the object detection range. Specifically, the range which has a gray background color in FIG. 5 is a range in which the object detection accuracy of the first object information acquisition means is less than a predetermined threshold value. As mentioned above, when the range in which object detection accuracy of the first object information acquisition means is low is removed as a part of the third range (that is a range where the first range that is an object detection range of the first object information acquisition means and the second range that is an object detection range of the second object information acquisition means overlap with each other) from the second range, as a result, an object existing in this range can be detected only by the first object information acquisition means. From a viewpoint of carrying out the collision avoidance assist more certainly and effectively, it is desirable to treat such a range in which object detection accuracy of the first object information acquisition means is low like this, as a part of the specific range from which the second object is selected as the collision judgment target object, instead of a part of the third range.

Therefore, in the second apparatus, the range which has a gray background color in FIG. 5, namely, the range in which the object detection accuracy of the first object information acquisition means is less than a predetermined threshold value, is removed from the third range. In other words, a range where a range in which the object detection accuracy of the first object information acquisition means is the predetermined threshold value or more and the second range overlap with each other is treated as the third range. Thereby, in accordance with the second apparatus, it is avoided that even the range in which the object detection accuracy of the first object information acquisition means is low is removed as a part of the third range from the second range and, thereby, it becomes impossible for the object existing in this range to be detected by any means other than the first object information acquisition means. Therefore, in accordance with the second apparatus, the collision avoidance assist can be carried out more certainly and effectively.

In addition, the threshold value for the object detection accuracy of the first object information acquisition means used as a criterion for determining which range should be removed from the third range among the ranges in which an object can be detected by the first object information acquisition means can be set properly according to an object detection accuracy required for suitable execution of the collision avoidance assist and/or laws and regulations about a collision avoidance assist in a destination of a vehicle on which the second apparatus is mounted, etc., for example.

Third Embodiment

Hereafter, a driving assist apparatus according to a third embodiment of the present invention (which may be referred to as a "third apparatus" hereafter.) will be explained, referring to drawings.

As mentioned above, in the first apparatus and the second apparatus, it is judged that the third condition is satisfied when the first locus and the second locus intersect with each other at a position within a predetermined distance from the self-vehicle on a front side of the self-vehicle in the first locus. It can be judged whether the third condition is satisfied or not, namely whether the first locus and the second locus intersect with each other at a position within a predetermined distance from the self-vehicle on a front side of the self-vehicle in the first locus or not, based on positions, speeds and running directions of the self-vehicle and the second object, etc., for example.

However, from a viewpoint of reducing the operation processing load associated with execution of the collision avoidance assist, it is desirable to judge whether the first locus and the second locus intersect with each other at a position within a predetermined distance from the self-vehicle on a front side of the self-vehicle in the first locus or not, by a simpler technique.

Therefore, the third apparatus is the above-mentioned first or second apparatus, characterized in that the collision judgment object selecting part judges that the third condition is satisfied when an angle between a running direction of the self-vehicle and a running direction of the second object is within a predetermined range.

For example, when a running direction of the second object which exists at a position a predetermined distance apart from the self-vehicle in a direction (transverse direction) orthogonal to a running direction (longitudinal direction) of the self-vehicle is parallel to the running direction of the self-vehicle, the predicted running locus (first locus) of the self-vehicle and the predicted running locus (second locus) of the second object do not intersect with each other. On the other hand, when the running direction of the second object is orthogonal to the running direction of the self-vehicle, the first locus and the second locus may intersect with each other. Moreover, when the running direction of the second object is in the middle of the longitudinal direction and the transverse direction, a possibility that the first locus and the second locus may intersect with each other changes depending on an angle between the running direction of the self-vehicle and the running direction of the second object, a positional relation and speeds of the self-vehicle and the second object, and the like, for example. Therefore, a range of the angle between the running direction of the self-vehicle and the running direction of the second object used as a criterion for the collision judgment object selecting part to judge that the third condition is satisfied may change depending on an angle between the running direction of the self-vehicle and the running direction of the second object, a positional relation and speeds of the self-vehicle and the second object, and the like, for example. Alternatively, the range of the angle may be a previously fixed range determined according to an angle between the running direction of the self-vehicle and the running direction of the second object, a positional relation and speeds of the self-vehicle and the second object which are expected in a situation where a possibility that the self-vehicle and the second object may collide with each other is high, and the like, for example.

In the third apparatus according to a preferred aspect, the range of the angle between the running direction of the self-vehicle and the running direction of the second object used as a criterion for the collision judgment object selecting part to judge that the third condition is satisfied is determined depending on which quadrant the second object exists in, in a coordinate system with the running direction of the self-vehicle (vertical axis direction) and a direction orthogonal to the vertical axis direction (horizontal axis direction) as coordinate axes.

Namely, in the third apparatus according to the preferred aspect, the collision judgment object selecting part is configured so as to judge that the third condition is satisfied when an intersection angle θ is within a predetermined range determined depending on a quadrant in which the second object exists in a predetermined X-Y coordinate system.

Specifically, the X-Y coordinate system is a coordinate system in which a position of the self-vehicle is an origin, the running direction of the self-vehicle is a positive direction of an X-axis, and a direction orthogonal to the X-axis and toward a left side from a right side of the self-vehicle is a positive direction of a Y-axis. in the X-Y coordinate system, a first quadrant is a range where X>0 and Y<0, a second quadrant is a range where X>0 and Y>0, a third quadrant is a range where X<0 and Y>0, and a fourth quadrant is a range where X<0 and Y<0. The intersection angle θ is an angle calculated by the following equation A from an X-axis component Vx and a Y-axis component Vy of a relative speed V (vector) of the second object with respect to the self-vehicle.

$$\theta=\tan^{-1}(Vx/|Vy|) \quad\quad\quad A$$

Furthermore, in the third apparatus according to the preferred aspect, the collision judgment object selecting part respectively judges that the third condition is satisfied when the intersection angle θ fulfills "−50°≤θ≤45°" in a case where the second object exists in the first quadrant or the second quadrant and when the intersection angle θ fulfills "0°≤θ≤45°" in a case where the second object exists in the third quadrant or the fourth quadrant.

Figure 6:
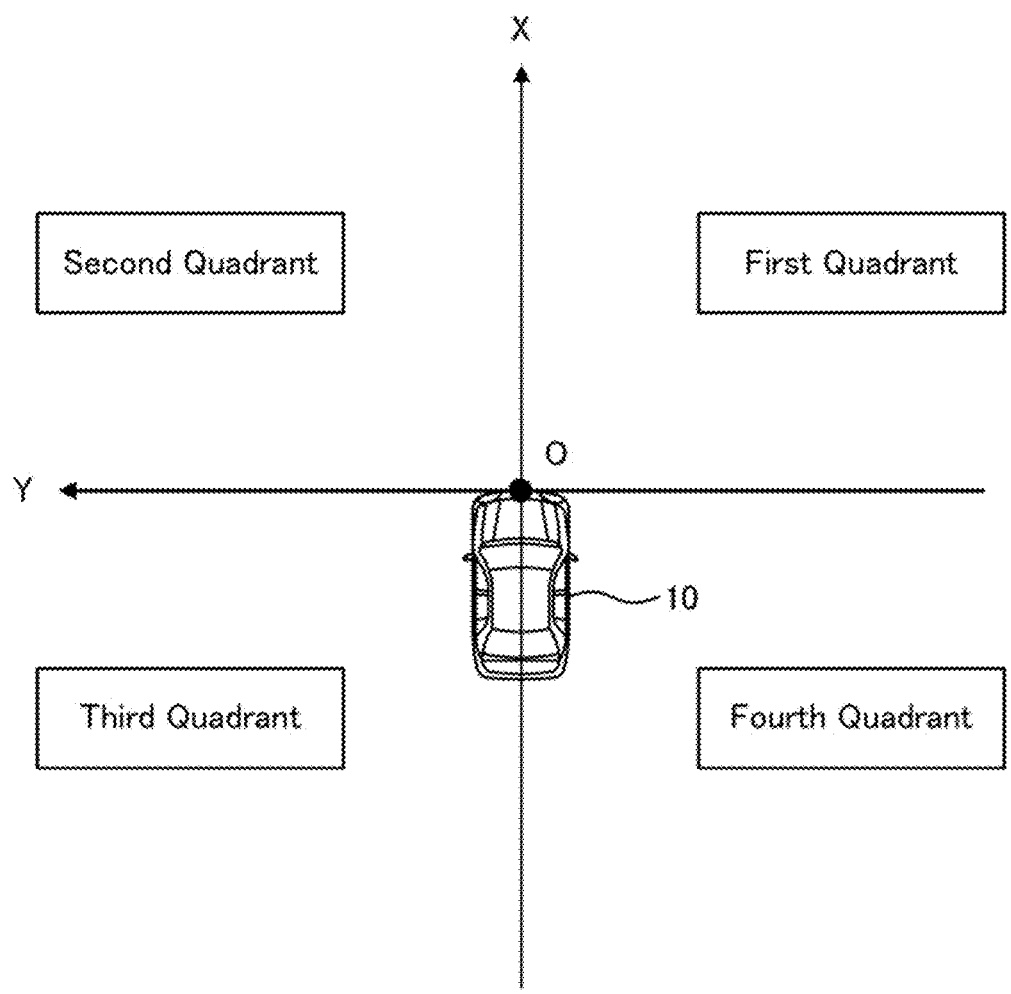
FIG. 6 is a schematic view for exemplifying a coordinate system used in a preferred aspect of a driving assist apparatus according to a third embodiment of the present invention (third apparatus).

FIG. 6 is a schematic view for exemplifying a coordinate system used in the third apparatus according to a preferred aspect. An X-Y coordinate system exemplified in FIG. 6 is a coordinate system in which a position of the self-vehicle 10 is an origin O, the running direction of the self-vehicle 10 is a positive direction of an X-axis, and a direction orthogonal to the X-axis and toward a left side from a right side of the self-vehicle 10 is a positive direction of a Y-axis. Moreover, in this X-Y coordinate system, a first quadrant is a range where X>0 and Y<0, a second quadrant is a range where X>0 and Y>0, a third quadrant is a range where X<0 and Y>0, and a fourth quadrant is a range where X<0 and Y<0.

Figure 7:
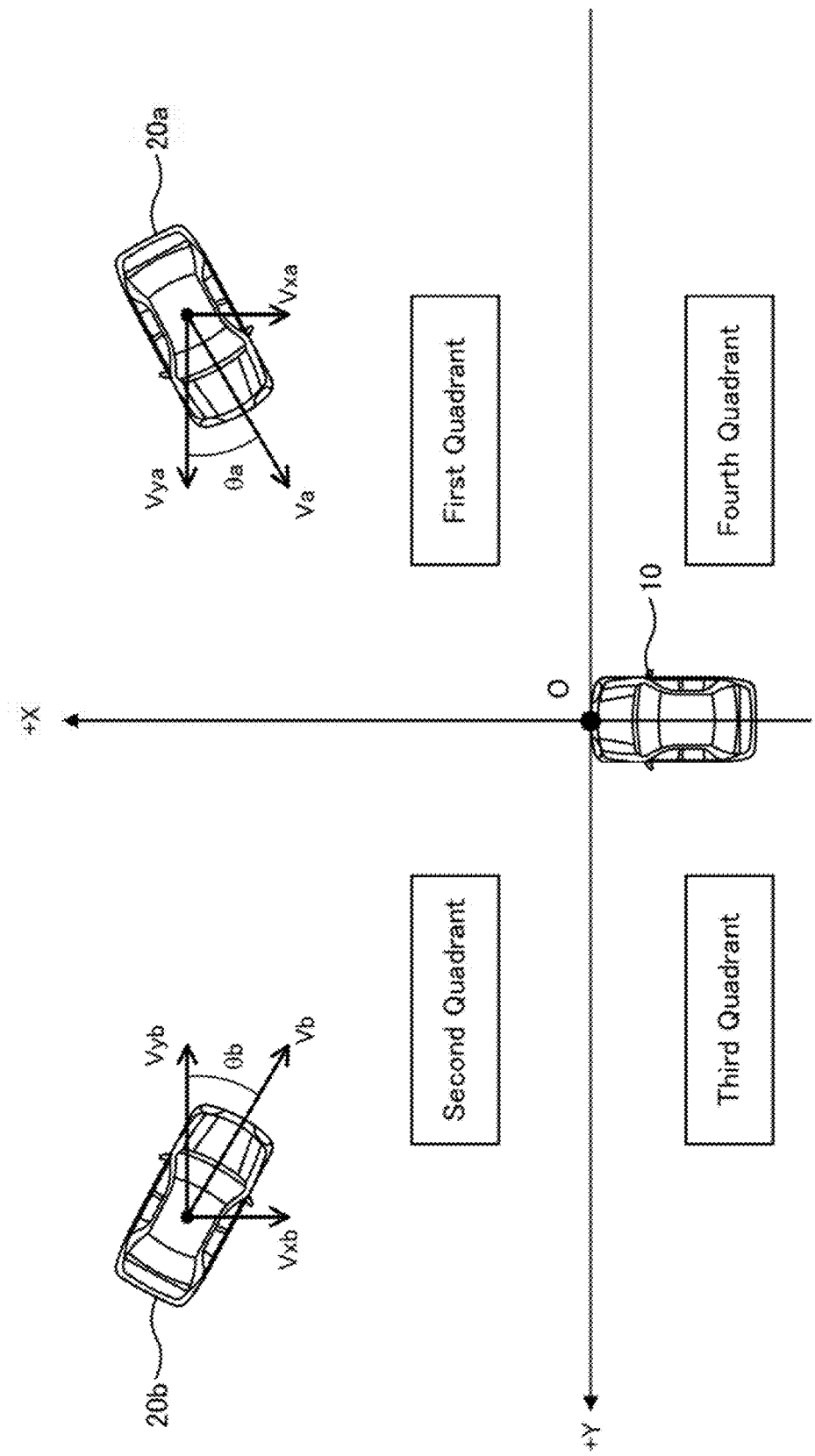
FIG. 7 is a schematic view for explaining an intersection angle θ used as an index for judging whether a third condition is satisfied in the third apparatus according to the preferred aspect.

Next, FIG. 7 is a schematic view for explaining the intersection angle θ used as an index for judging whether the third condition is satisfied in the third apparatus according to the preferred aspect. Similarly to FIG. 6, an X-Y coordinate system exemplified in FIG. 7 is also a coordinate system in which a position of the self-vehicle 10 is an origin O, the running direction of the self-vehicle 10 is a positive direction of an X-axis, and a direction orthogonal to the X-axis and toward a left side from a right side of the self-vehicle 10 is a positive direction of a Y-axis. Moreover, similarly to FIG. 6, a first quadrant is a range where X>0 and Y<0, a second quadrant is a range where X>0 and Y>0, a third quadrant is a range where X<0 and Y>0, and a fourth quadrant is a range where X<0 and Y<0.

As shown in FIG. 7, the another vehicle 20a exists in the first quadrant. Namely, when coordinates which indicate a position of the another vehicle 20a are set as (xa, ya), xa>0 and ya <0. Moreover, when an X-axis component and Y-axis component of the relative speed Va (vector) of the another vehicle 20a with respect to the self-vehicle 10 are set as Vxa and Vya, respectively, an intersection angle θa of the another vehicle 20a can be represented by the following equation A1, similarly to the above-mentioned the equation A.

$$\theta a=\tan^{-1}(Vxa/|Vya|) \quad\quad\quad A1$$

Moreover, the another vehicle 20b exists in the second quadrant. Namely, when coordinates which indicate a position of the another vehicle 20b are set as (xb, yb), xb>0 and yb >0. Moreover, when an X-axis component and Y-axis component of the relative speed Vb (vector) of the another vehicle 20b with respect to the self-vehicle 10 are set as Vxb and Vyb, respectively, an intersection angle θb of the another vehicle 20b can be represented by the following equation A2, similarly to the above-mentioned the equation A.

$$\theta b = \tan^{-1}(Vxb/|Vyb|) \qquad \text{A2}$$

When the X-axis component Vx of the relative speed V (vector) is oriented toward the negative direction of the X-axis like the another vehicle 20a and the another vehicle 20b exemplified in FIG. 7, the intersection angle θ is a negative value. In this case, when a value of the intersection angle θ is excessively small (its absolute value is excessively large), it is considered that a possibility that the another vehicles may pass behind the self-vehicle 10 without colliding with the self-vehicle 10 is high. On the other hand, when the X-axis component Vx of the relative speed V (vector) is oriented toward the positive direction of the X-axis, the intersection angle θ is a positive value. In this case, when the value of the intersection angle θ is excessively large (its absolute value is excessively large), it is considered that a possibility that the another vehicles may pass in front of the self-vehicle 10 without colliding with the self-vehicle 10 is high.

Therefore, regarding the another vehicle existing in the first quadrant or the second quadrant, it is considered that the another vehicle with a value of the intersection angle θ within a range from a predetermined lower limit that is a negative value to a predetermined upper limit that is a positive value may collide with the self-vehicle. As a result of diligent research based on such a viewpoint, the present inventor has found out that it is desirable to configure the collision judgment object selecting part so as to judge that the third condition is satisfied when the intersection angle θ fulfills "−50°≤θ≤45°" in a case where the second object exists in the first quadrant or the second quadrant.

On the other hand, although not shown, x<0 and y>0 in coordinates which indicate a position of the another vehicle existing in the third quadrant, and x<0 and y<0 in coordinates which indicate a position of the another vehicle existing in the fourth quadrant, and when the X-axis component and Y-axis component of the relative speed V (vector) of these another vehicles with respect to the self-vehicle are set as Vx and Vy, respectively, the intersection angles θ of these another vehicles can be represented in a similar manner to the above-mentioned equation A.

When the X-axis component Vx of the relative speed V (vector) of these another vehicles is oriented toward the negative direction of the X-axis, the intersection angle θ is a negative value, and a possibility that these another vehicles may pass behind the self-vehicle without colliding with the self-vehicle is considered to be high. On the other hand, when the X-axis component Vx of the relative speed V (vector) is directed toward the positive direction of the X-axis, the intersection angle θ is a positive value. In this case, when the value of the intersection angle θ is excessively large (its absolute value is excessively large), a possibility that the another vehicle may pass in front of the self-vehicle without colliding with the self-vehicle is considered to be high.

Therefore, regarding the another vehicle existing in the third quadrant or the fourth quadrant, it is considered that the another vehicle with a value of the intersection angle θ which is a positive value less than a predetermined upper limit may collide with the self-vehicle. As a result of diligent research based on such a viewpoint, the present inventor has found out that it is desirable to configure the collision judgment object selecting part so as to judge that the third condition is satisfied when the intersection angle θ fulfills "0°≤θ≤45°" in a case where the second object exists in the third quadrant or the fourth quadrant.

As mentioned above, in the third apparatus, it is possible to judge whether the first locus and the second locus intersect with each other at a position within a predetermined distance from the self-vehicle on a front side of the self-vehicle in the first locus or not, by a simple technique based on an angle between the running direction of the self-vehicle and the running direction of the second object. Therefore, in accordance with the third apparatus, the operation processing load associated with execution of the collision avoidance assist can be reduced effectively.

In addition, although a center of a front of the self-vehicle 10 is used as a position of the self-vehicle 10 and this position is set as an origin O in the examples shown in FIG. 6 and FIG. 7, any position other than the center of the front can be used as a position of the self-vehicle 10.

Fourth Embodiment

Hereafter, a driving assist apparatus according to a fourth embodiment of the present invention (which may be referred to as a "fourth apparatus" hereafter.) will be explained, referring to drawings.

As mentioned above, in the driving assist apparatus according to the present invention (present invention apparatus) including the first apparatus to the third apparatus, the second object for which all the first to third conditions are simultaneously satisfied is selected as the collision judgment target object. In other words, in the present invention apparatus, the second object for which at least one of the first condition to the third condition is not satisfied will not be selected as the collision judgment target object. Thereby, in the present invention apparatus, the second object with a low possibility to collide with the self-vehicle can be excluded from being a target of the collision avoidance assist. Therefore, in accordance with the present invention apparatus, operation processing load in a control unit for executing a collision avoidance assist can be effectively reduced while executing the collision avoidance assist effectively.

However, even when all the first to third conditions are satisfied simultaneously, namely even when the predicted running locus (second locus) of the second object which exists in the specific range and the predicted running locus (first locus) of the self-vehicle intersect with each other at a position within a predetermined distance on the front side of the self-vehicle, it may take a long time for the second object to arrive at a crossing of the second locus and the first locus, and the self-vehicle may pass through the crossing before the second object arrives at the crossing, depending on a speed of the second object advancing into a front side of the self-vehicle and distance between the second object and the self-vehicle in a direction (transverse direction) orthogonal to the running direction of the self-vehicle. Therefore, from a viewpoint of certainly excluding the second object having a low possibility to collide with the self-vehicle from being a target of the collision avoidance assist to reduce the operation processing load associated with execution of the collision avoidance assist, it is desirable that the second object for which a time period required for arriving at a front side of the self-vehicle is longer than a predetermined threshold value is not selected as the collision judgment target object.

Therefore, the fourth apparatus is any one of the above-mentioned first to third apparatuses, characterized in that the first collision judging condition group further includes a fourth condition as described below, in addition to the above-mentioned first to third conditions.

The fourth condition is a condition that an estimated time to collision (ETC) value calculated based on the relative speed of the second object with respect to the self-vehicle and the positional relation between the second object and the self-vehicle in a predetermined X-Y coordinate system is a predetermined threshold value or less.

Specifically, the X-Y coordinate system is a coordinate system in which a position of the self-vehicle is an origin, a running direction of the self-vehicle is a positive direction of an X-axis, and a direction orthogonal to the X-axis and toward a left side from a right side of the self-vehicle is a positive direction of a Y-axis. The ETC value is a value calculated by the following equation B from a Y-axis component $\Delta y$ of a relative speed V of the second object with respect to the self-vehicle and a difference Ay between a Y coordinate of the second object and a Y coordinate of the self-vehicle.

$$\text{ETC Value} = |\Delta y / Vy| \qquad B$$

The "predetermined threshold value" used as a criterion for judging whether the fourth condition is satisfied or not based on the ETC value may be a value which changes depending on a positional relation between the self-vehicle and the second object (for example, a distance between a crossing of the second locus and the first locus and the self-vehicle, etc.) and a speed of the self-vehicle, and the like, for example. Alternatively, the "predetermined threshold value" may be a fixed value determined according to a positional relation between the self-vehicle and the second object (for example, a distance between a crossing of the second locus and the first locus and the self-vehicle, etc.) and a speed of the self-vehicle which are expected in a situation where a possibility that the self-vehicle and the second object may collide with each other is high, and the like, for example.

Figure 8:
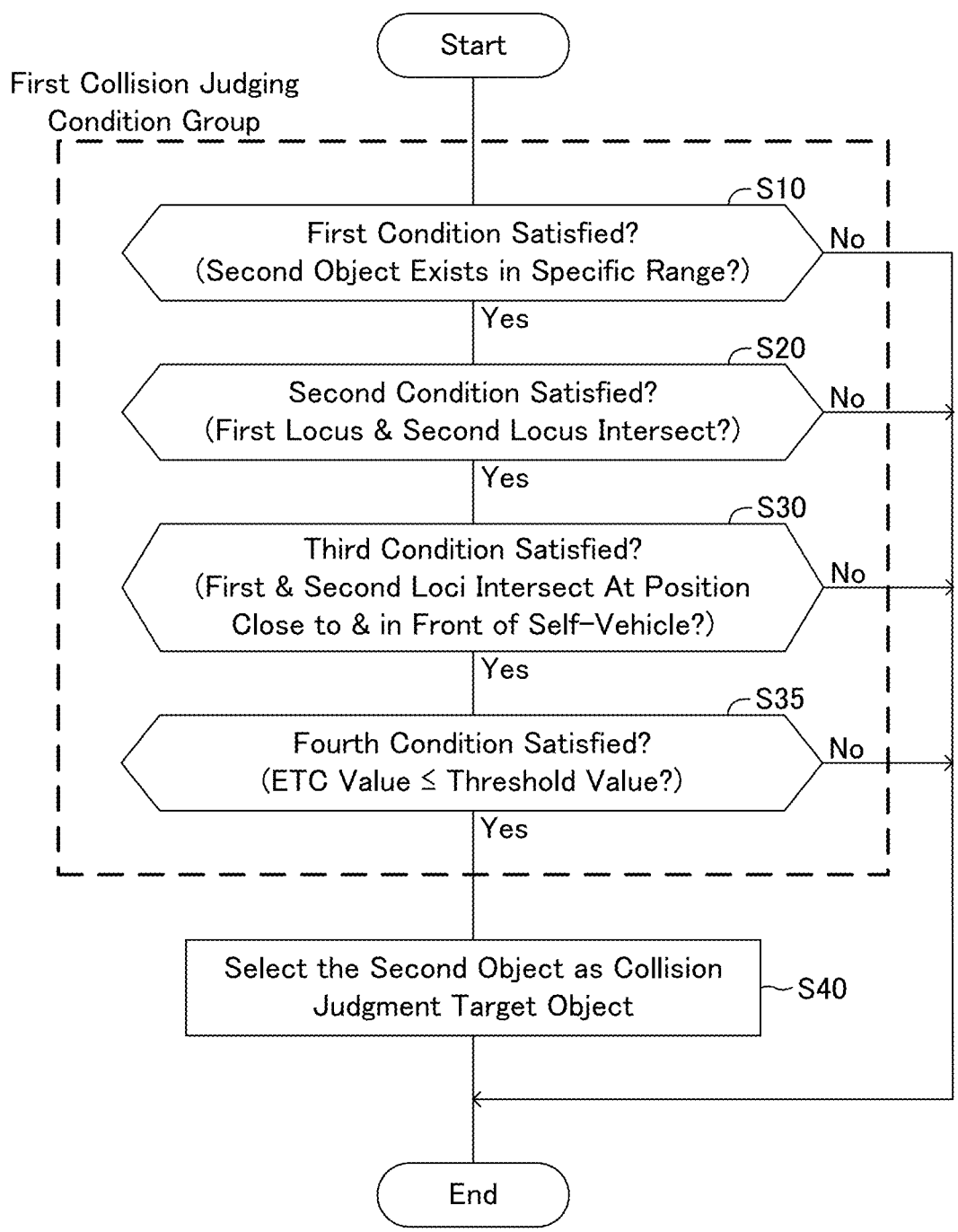
FIG. 8 is a flow chart for showing an example of a flow of various processing in a collision judgment target object selecting routine carried out in a driving assist apparatus according to a fourth embodiment of the present invention (fourth apparatus).

FIG. 8 is a flow chart for showing an example of a flow of various processing in a collision judgment target object selecting routine carried out in the fourth apparatus. The flow chart exemplified in FIG. 8 is the same as the flow chart exemplified in FIG. 4 except for a point that Step S35 in which it is judged whether the above-mentioned fourth condition is satisfied or not is added after Step S30 in which it is judged whether the above-mentioned third condition is satisfied or not.

Namely, also in the collision risk exclusion routine carried out in the fourth apparatus, which is represented by the flow chart exemplified in FIG. 8, Step S10 to Step S30 are the same as those in the flow chart exemplified in FIG. 4. Then, after Step S30, in Step S35, it is judged whether the fourth condition is satisfied or not, namely whether the above-mentioned ETC value is the predetermined threshold value or less, or not.

When the fourth condition is satisfied (Step S35: Yes), since all the conditions included in the first collision judging condition group that is a condition group consisting of the above-mentioned first to fourth conditions are simultaneously satisfied, the second object concerned is selected as the collision judgment target object in the next Step S40. On the other hand, when a judgment result is "No" in any of Step S10 in which it is judged whether the first condition is satisfied or not, Step S20 in which it is judged whether the second condition is satisfied or not, Step S30 in which it is judged whether the third condition is satisfied or not, and Step S35 in which it is judged whether the fourth condition is satisfied or not, the collision judgment target object selecting routine is once ended at that time point. Therefore, the second object for which any one or more of the first to fourth conditions is not satisfied is not selected as the collision judgment target object.

As mentioned above, in the fourth apparatus, the second object for which not only the above-mentioned first to third conditions, but also the fourth condition are simultaneously satisfied is selected as the collision judgment target object. Namely, the second object which fulfills not only the condition that the second object exists in the specific range and the predicted running locus (second locus) of the second object and the predicted running locus (first locus) of the self-vehicle intersect with each other at a position within a predetermined distance on the front side of the self-vehicle, but also a condition that a time period required for arriving at a front side of the self-vehicle is a predetermined threshold value or less is selected as the collision judgment target object. As a result, in accordance with the fourth apparatus, the second object having a low possibility to collide with the self-vehicle can be more certainly excluded from being a target of the collision avoidance assist to reduce the operation processing load associated with execution of the collision avoidance assist more effectively.

Fifth Embodiment

Hereafter, a driving assist apparatus according to a fifth embodiment of the present invention (which may be referred to as a "fifth apparatus" hereafter.) will be explained.

As mentioned above, in the driving assist apparatus according to the present invention (present invention apparatus) including the first apparatus to the fourth apparatus, the second object for which all the conditions included in the first collision judging condition group including the above-mentioned first to third conditions or the first collision judging condition group including the above-mentioned first to fourth conditions are simultaneously satisfied is selected as the collision judgment target object. Thereby, in accordance with the present invention apparatus, operation processing load in a control unit for executing a collision avoidance assist can be effectively reduced while executing the collision avoidance assist effectively.

However, there are not always many objects for which the second information is acquired by the second object information acquisition means, and there are not always many second objects selected as the collision judgment target object even in a case where there are many objects for which the second information is acquired by the second object information acquisition means. Namely, depending on the number and/or state of the objects detected by the second object information acquisition means, there is a possibility that the number of the second objects selected as the collision judgment target object may be small and therefore there may be a margin of operation processing capability of the control unit for carrying out the collision avoidance assist with respect to the operation processing load associated with execution of the collision avoidance assist.

In a case as mentioned above, at least a part of the second objects which were not selected as the collision judgment target object since all the conditions included in the first collision judging condition group were not satisfied simultaneously may be additionally selected as the collision judgment target object. Especially, regarding the second object which was not selected as the collision judgment target object since the second object exists in the third range that is a range where the first range that is an object detection range of the first object information acquisition means and the second range that is an object detection range of the second object information acquisition means overlap with each other (the first condition is not satisfied), there is a possibility that the predicted running locus (second locus) of the second object and the predicted running locus (first locus) of the self-vehicle intersect with each other at a position within a predetermined distance on the front side of the self-vehicle, similarly to the second object which exists in the specific range. As for such an object existing in the third range, the first information is acquired by the first object information acquisition means, and an object with a high possibility to collide with the self-vehicle is selected as a target of the collision avoidance assist.

However, from a viewpoint of preventing an unexpected situation such as omission in detection by the first object information acquisition means, for example, and carrying out the collision avoidance assist more certainly, in a case where there is a margin of the operation processing capability, even as for such a second object which exists in the third range, it is desirable to judge whether the predicted running locus (second locus) of the second object and the predicted running locus (first locus) of the self-vehicle intersect with each other at a position within a predetermined distance on the front side of the self-vehicle or not, namely whether the second condition and the third condition are satisfied or not, and to select the second object as the collision judgment target object to be subjected to the collision avoidance assist when these conditions are satisfied.

Therefore, the fifth apparatus is any one of the above-mentioned first to fourth apparatuses, characterized in that the collision judgment object selecting part additionally selects, as the collision judgment target object, at least a part of the second objects for which all conditions included in a second collision judging condition group are simultaneously satisfied, when the number of the second object selected as the collision judgment target object based on the first collision judging condition group is smaller than a predetermined threshold value. The second collision judging condition group is the first collision judging condition group including a fifth condition which is a condition that the second object exists in the third range in place of the first condition.

Namely, the second collision judging condition group includes the fifth condition, the second condition and the third condition, and may additionally include the fourth condition that is conditions that the ETC value is a predetermined threshold value or less, similarly to the first collision judging condition group.

Figure 9:
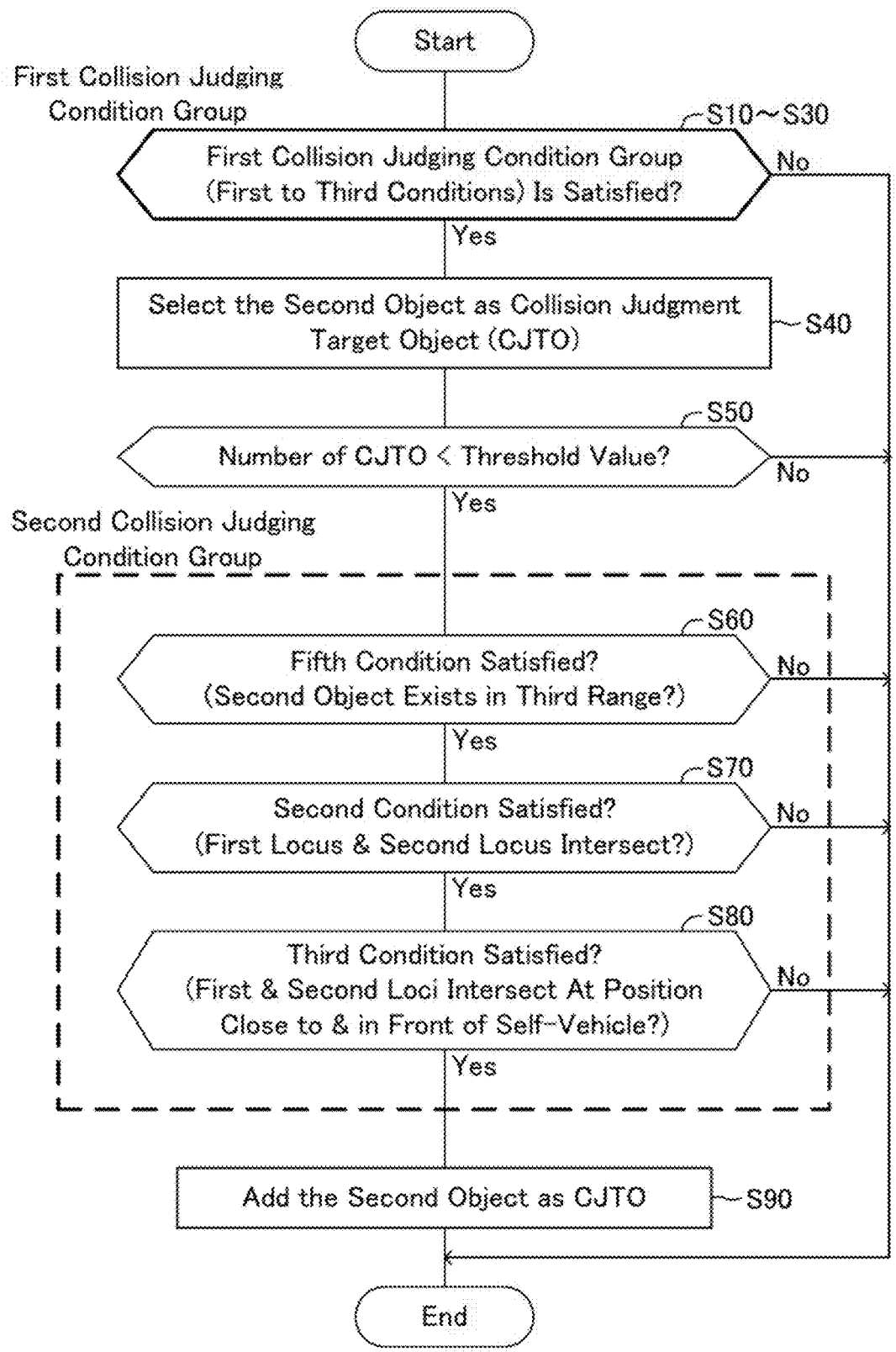
FIG. 9 is a flow chart for showing an example of a flow of various processing in a collision judgment target object selecting routine carried out in a driving assist apparatus according to a fifth embodiment of the present invention (fifth apparatus).

FIG. 9 is a flow chart for showing an example of a flow of various processing in a collision judgment target object selecting routine carried out in the fifth apparatus. The flow chart exemplified in FIG. 9 is the same as the flow chart exemplified in FIG. 4 except for a point that Step S50 to Step S90 are added after Step S40 in which the second object for which all the conditions included in the first collision judging condition group are satisfied is selected as the collision judgment target object. Although Step S10 to Step S30 are collected into one in FIG. 9 in order to make it possible to illustrate the whole collision judgment target object selecting routine in FIG. 9, processing carried out in these three steps is the same as that explained while referring to the flow chart exemplified in FIG. 4.

Also in the collision risk exclusion routine carried out in the fifth apparatus, which is represented by the flow chart exemplified in FIG. 9, Step S10 to Step S40 are the same as those in the flow chart exemplified in FIG. 4. Then, after Step S40, it is judged whether the number of the second object selected as the collision judgment target object in Step S40 is smaller than a predetermined threshold value, namely whether there is a margin of operation processing capability of the control unit for carrying out the collision avoidance assist with respect to the operation processing load associated with execution of the collision avoidance assist.

When the number of the second object selected as the collision judgment target object in Step S40 is smaller than a predetermined threshold value (Step S50: Yes), it is judged whether all the conditions included in the second collision judging condition group are satisfied simultaneously or not, in following Step S60 to Step S80. It is judged whether the above-mentioned fifth condition is satisfied or not (namely, whether the second object exists in the third range or not) in Step S60.

When the fifth condition is satisfied (Step S60: Yes), it is judged whether the above-mentioned second condition is satisfied (namely, whether the first locus that is a predicted running locus of the self-vehicle and the second locus that is a predicted running locus of the second object intersect with each other or not) in the next Step S70. Namely, processing carried out in Step S70 is the same as the processing carried out in the above-mentioned Step S20, but ranges in which the second object to be a target of the processing exists are different from each other.

When the second condition is satisfied (Step S70: Yes), it is judged in the next Step S80 whether the above-mentioned third condition is satisfied or not (namely, whether the first locus and the second locus intersect with each other at a position within a predetermined distance from the self-vehicle on the front side of the self-vehicle or not). Namely, processing carried out in Step S80 is the same as the processing carried out in the above-mentioned Step S30, but ranges in which the second object to be a target of the processing exists are different from each other.

When the third condition is satisfied (Step S80: Yes), since all the conditions included in the second collision judging condition group that is a condition group consisting of the above-mentioned fifth condition, second condition and third condition are simultaneously satisfied, the second object is additionally selected as (added to) the collision judgment target object in the next Step S90. On the other hand, when a judgment result is "No" in any of Step S60 in which it is judged whether the fifth condition is satisfied or not, Step S70 in which it is judged whether the second condition is satisfied or not, and Step S80 in which it is judged whether the third condition is satisfied or not, the collision judgment target object selecting routine is once ended at that time point. Therefore, the second object for which any one or more of the fifth, second and third conditions is not satisfied is not added to the collision judgment target object.

Namely, in the fifth apparatus, when the number of the second object selected as the collision judgment target object based on the first collision judging condition group is smaller than a predetermined threshold value, the second object for which the second condition and the third condition are satisfied among the second objects which exist in the third range is added to the collision judgment target object. Therefore, in the fifth apparatus, when there is a margin of operation processing capability of the control unit for carrying out the collision avoidance assist with respect to the operation processing load associated with execution of the collision avoidance assist, even as for the second object which exists in the third range and has a possibility that the second locus and the first locus may intersect with each other at a position within a predetermined distance on the front side of the self-vehicle, a possibility to collide with the self-vehicle is judged based on the second information. As a result, in accordance with the fifth apparatus, the collision avoidance assist can be carried out still more effectively within a range of the operation processing capability of the control unit for carrying out the collision avoidance assist.

By the way, in the example shown in FIG. 9, the first to third conditions are included in the first collision judging condition group, and the fifth, second and third conditions are included in the second collision judging condition group. However, as mentioned above, the first collision judging condition group may further include the fourth condition, in addition to the first to third conditions. Similarly, the second collision judging condition group may further include the fourth condition, in addition to the fifth, second and third conditions.

Although some embodiments which have specific configurations have been explained, sometimes referring to accompanying drawings, as the above, for the purpose of explaining the present invention, it should not be interpreted that the scope of the present invention is limited to these exemplary embodiments, and it is needless to say that modifications can be properly added within the limits of the matter described in the claims and the specification. For example, the present invention can be applied to an autonomous vehicle.

REFERENCE SIGNS LIST

10: Self-Vehicle
20, 20a, 20b: Second Object (Another Vehicle)
101: Driving Assist Apparatus (First Apparatus)
  110: First Object Information Acquisition Means
  120: Second Object Information Acquisition Means
  130: Collision Avoidance Assist Control Means
    131: Collision Judgment Object Selecting Part

The invention claimed is:

1. A driving assist apparatus comprising:
a first object information acquisition means to acquire first information that is information about a first object which exists in a front side region of a self-vehicle,
a second object information acquisition means to acquire second information that is information about second objects which exist in a front lateral side region of said self-vehicle, and
a collision avoidance assist control means to carry out a collision avoidance assist that is assist for avoiding a collision of said self-vehicle and a collision risk object that is one of said first object or said second objects judged to collide with said self-vehicle when said collision risk object is judged to exist based on at least ether one of said first information and said second information,
wherein:
said collision avoidance assist control means comprises a collision judgment object selecting part to select, among said second objects, a collision judgment target object that is said second object whose possibility to collide with said self-vehicle is to be judged based on said second information,
said collision judgment object selecting part selects, as said collision judgment target object, said second object for which all conditions included in a first collision judging condition group that is a condition group consisting of a plurality of conditions are simultaneously satisfied, and said first collision judging condition group consists of:
a first condition which is a condition that said second object exists in a specific range that is a range excluding a third range that is a range where a first range that is an object detection range of said first object information acquisition means and a second range that is an object detection range of said second object information acquisition means overlap with each other from said second range,
a second condition which is a condition that a first locus that is a predicted running locus of said self-vehicle and a second locus that is a predicted running locus of said second object intersect with each other, and
a third condition which is a condition that said first locus and said second locus intersect with each other at a position within a predetermined distance from said self-vehicle on a front side of said self-vehicle in said first locus.

2. The driving assist apparatus according to claim 1, wherein:
a range in which object detection accuracy of said first object information acquisition means is less than a predetermined threshold value is excluded from said third range.

3. The driving assist apparatus according to claim 1, wherein:
said collision judgment object selecting part judges that said third condition is satisfied when an angle between a running direction of said self-vehicle and a running direction of said second object is within a predetermined range.

4. The driving assist apparatus according to claim 3, wherein:
said collision judgment object selecting part respectively judges that said third condition is satisfied when an intersection angle θ fulfills $-50° \leq \theta \leq 45°$ in a case where said second object exists in a first quadrant or a second quadrant and when said intersection angle θ fulfills $0° \leq \theta \leq 45°$ in a case where said second object exists in a third quadrant or a fourth quadrant, in a coordinate system in which a position of said self-vehicle is an origin, said running direction of said self-vehicle is a positive direction of an X-axis, and a direction orthogonal to said X-axis and toward a left side from a right side of said self-vehicle is a positive direction of a Y-axis, and said first quadrant is a range where X>0 and Y<0, said second quadrant is a range where X>0 and Y>0, said third quadrant is a range where X<0 and Y>0, and said fourth quadrant is a range where X<0 and Y<0, and said intersection angle θ is an angle calculated by the following equation A $$\theta = \tan^{-1}(Vx/|Vy|) \quad \quad A$$

from an X-axis component Vx and a Y-axis component Vy of a relative speed V of said second object with respect to said self-vehicle.

5. The driving assist apparatus according to claim 1, wherein:
said first collision judging condition group further includes, in addition to said first condition to said third condition, a fourth condition which is a condition that an estimated time to collision (ETC) value is a predetermined threshold value or less, and
said ETC value is calculated by the following equation B $$\text{ETC Value} = |\Delta y/Vy| \quad \quad B$$

from a Y-axis component Vy of a relative speed V of said second object with respect to said self-vehicle and a difference Δy between a Y coordinate of said second object and a Y coordinate of said self-vehicle in a coordinate system in which a position of said self-vehicle is an origin, a running direction of said self-vehicle is a positive direction of an X-axis, and a direction orthogonal to said X-axis and toward a left side from a right side of said self-vehicle is a positive direction of a Y-axis.

6. The driving assist apparatus according to claim 1, wherein:

said collision judgment object selecting part additionally selects, as said collision judgment target object, at least a part of said second objects for which all conditions included in a second collision judging condition group that is said first collision judging condition group including a fifth condition which is a condition that said second object exists in said third range in place of said first condition are simultaneously satisfied, when the number of said second object selected as said collision judgment target object based on said first collision judging condition group is smaller than a predetermined threshold value.

* * * * *